A. E. HANSON.
DITCHING MACHINE AND TILE DISTRIBUTER.
APPLICATION FILED FEB. 16, 1911.
1,022,843.
Patented Apr. 9, 1912.
2 SHEETS—SHEET 2.
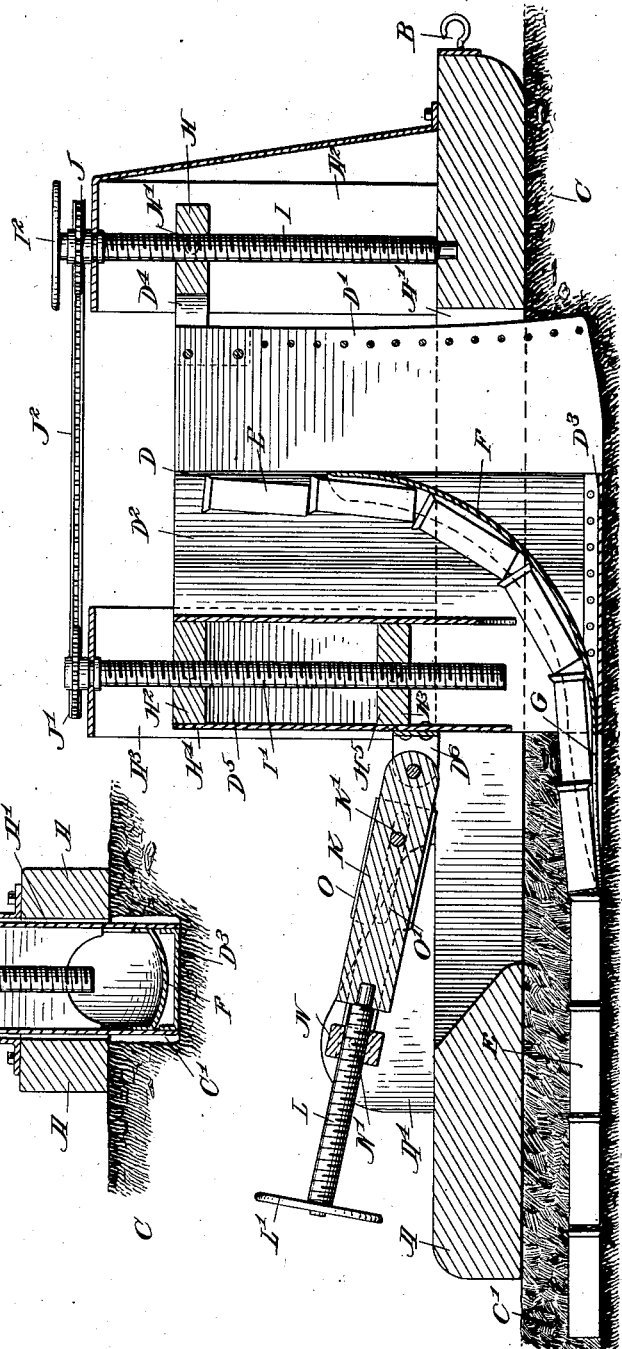
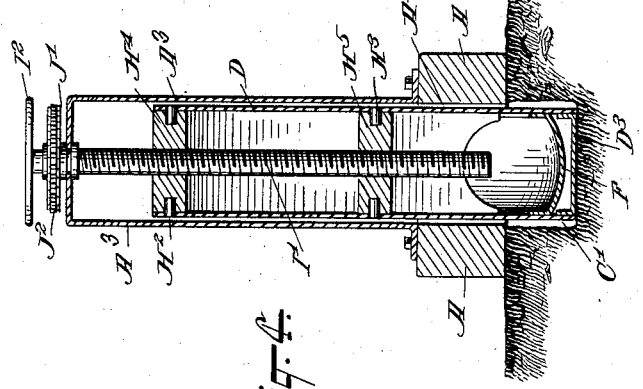
WITNESSES
INVENTOR
Albertus E. Hanson
BY
ATTORNEYS

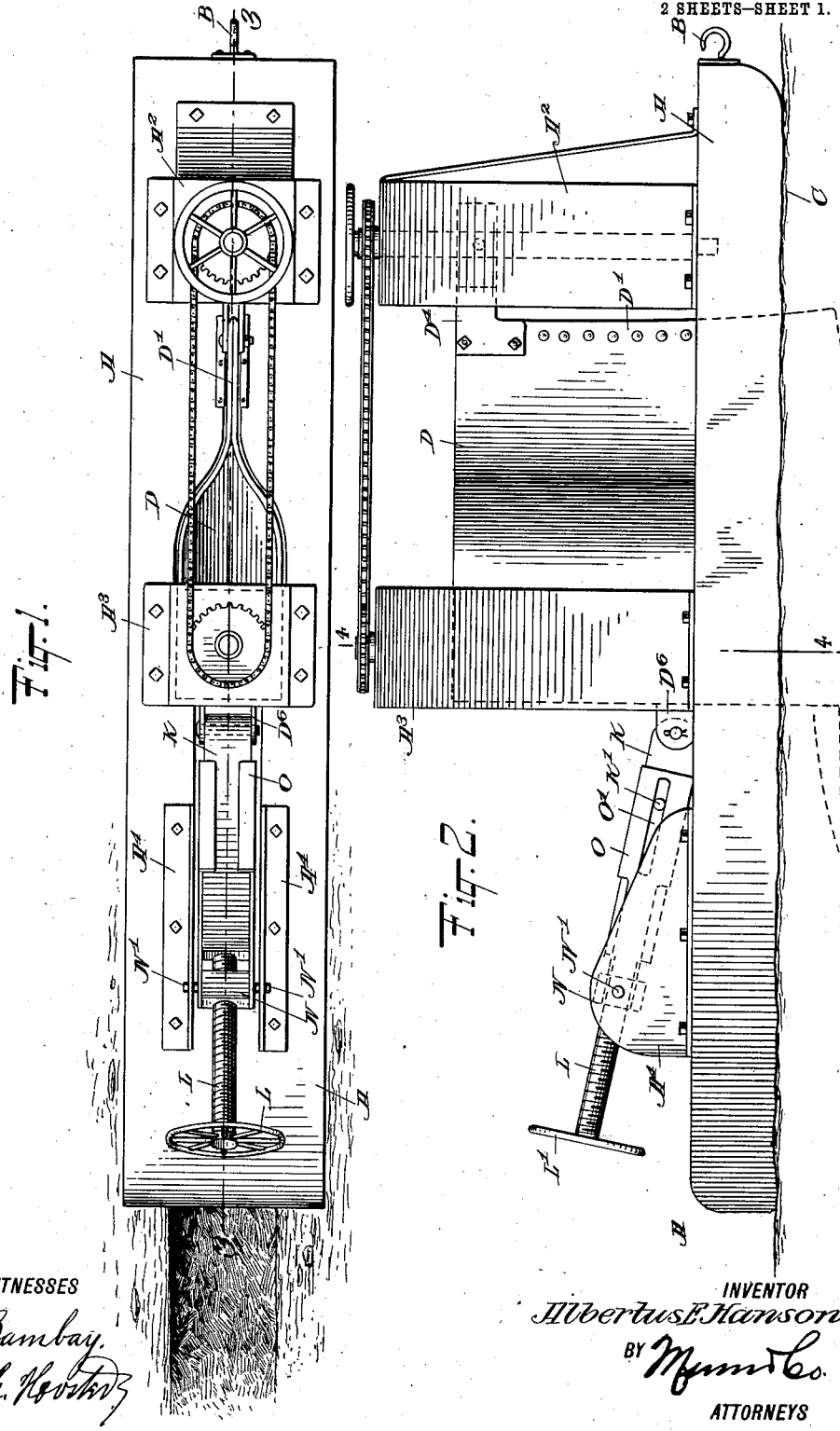

UNITED STATES PATENT OFFICE.

ALBERTUS E. HANSON, OF MASON CITY, IOWA.

DITCHING-MACHINE AND TILE-DISTRIBUTER.

1,022,843.  Specification of Letters Patent.  Patented Apr. 9, 1912.

Application filed February 16, 1911. Serial No. 608,885.

*To all whom it may concern:*

Be it known that I, ALBERTUS E. HANSON, a citizen of the United States, and a resident of Mason City, in the county of Cerro Gordo and State of Iowa, have invented a new and Improved Ditching-Machine and Tile-Distributer, of which the following is a full, clear, and exact description.

The invention relates to the laying of pipes or hollow tiles in ditches, and its object is to provide a new and improved ditching machine and tile distributer, arranged to readily form a ditch in the ground and to place the tiles or pipes into the bottom of the ditch for convenient joining of the tiles or pipes to form a line of such tiles or pipes.

For the purpose mentioned use is made of a bed adapted to be drawn over the ground in which the ditch is to be formed, a spreader vertically adjustable on the said bed and projecting below the same to form the ditch in the ground to a desired depth, and a tile chute arranged on the said spreader and extending downwardly and rearwardly and terminating at the bottom of the ditch so that the tiles or pipes pass down the chute into the ditch, one in front of the other.

A practical embodiment of the invention is represented in the accompanying drawings forming a part of this specification, in which similar characters of reference indicate corresponding parts in all the views.

Figure 1 is a plan view of the ditching machine and tile distributer; Fig. 2 is a side elevation of the same; Fig. 3 is a longitudinal central section of the same on the line 3—3 of Fig. 1; and Fig. 4 is a cross section of the same on the line 4—4 of Fig. 2.

The bed A of the machine is preferably in the form of a rectangular block, provided at its forward end with a hook B for engagement with a single or double tree for attaching draft animals to the machine for drawing the same forward over the ground C, as indicated in the drawings. The bed A is provided with an elongated opening A' in which is fitted to move up and down a spreader D having a V-shaped front D' for cutting into the ground so as to force the ground sidewise in opposite directions and thereby form a ditch C' of a desired depth corresponding to the distance the spreader D projects below the bottom of the bed A. The spreader D is provided in the rear of the V-shaped front D' with a tile or pipe-receiving opening $D^2$ for the reception of the tiles or pipes E to be laid in the ditch C', and in the said opening $D^2$ is arranged a downwardly and rearwardly curved chute F terminating at its lower rear end in a trailer G projecting beyond the rear end of the bottom $D^3$ of the spreader D and into the ditch C'. The trailer G extends approximately horizontally and is V-shaped so that when the machine is drawn forward the tiles or pipes E piled one on top of the other in the opening $D^2$ press the rearmost tile off the trailer G into the ditch, so that the tiles E are distributed one in front of the other in the ditch C', as indicated in Fig. 3.

In order to adjust the spreader D vertically, according to the depth of the ditch C' to be formed, the following arrangement is made: A bracket $D^4$ is arranged on the upper forward portion of the spreader D, and in the said bracket are journaled the trunnions H' of a nut H, in which screws a vertically-disposed screw rod I journaled at its lower end in the bed A, and at its upper end in a standard $A^2$ erected on the forward portion of the bed A. The rear end $D^5$ of the spreader D is in the form of a chamber in which are journaled trunnions $H^2$ and $H^3$ projecting from nuts $H^4, H^5$ in which screws a vertically-disposed screw rod I' journaled at its upper end in a standard $A^3$ attached to the bed A near the middle thereof. The upper ends of the screw rods I and I' are provided with sprocket wheels J, J', around which passes a sprocket chain $J^2$, and on the upper end of the screw rod I is also secured a hand wheel $I^2$ under the control of an operator for turning the screw rod I and with it the screw rod I' by the action of the sprocket wheels J, J' and the sprocket chain $J^2$.

It is understood that on turning the hand wheel $I^2$ the spreader D is raised, and by turning the hand wheel in the opposite direction the spreader D is lowered relative to the bed A, so that the spreader can be projected any desired distance below the bottom of the bed A according to the depth of the ditch C' to be formed.

The rear end of the spreader D is provided with brackets $D^6$ pivotally connected with an abutment bar K, extending rearwardly and upwardly and engaged at its rear end by a screw rod L having a hand wheel L' and screwing in a nut N provided with trunnions N' journaled in bearings A⁴ attached to the rear end of the bed A. The abutment bar K is provided with a transversely-extending pin K', projecting at its ends into slots O' formed in the sides of a bearing O hung on the trunnions N' so as to swing from the trunnions as the center. It is understood that when the spreader D is raised or lowered, a corresponding adjustment is to be made of the abutment bar K by screwing the screw rod L forward or backward in the trunnion nut N. By the arrangement described, the strain on the spreader D, incident to the forward movement thereof in the ground C, is taken up by the abutment bar K so as to relieve the screw rods I and I' of undue pressure.

It is understood that when the machine is drawn forward the spreader D forms the ditch C' in the ground to the desired depth, and at the same time the tiles or pipes E are distributed in the ditch C' one in front of the other, so as to permit of conveniently and quickly joining the tiles for forming a desired duct.

The rear screw rod I' preferably screws in the two nuts H⁴ and H⁵, as the lower end of this screw rod I' cannot well be journaled in the bed A, the same as the front screw rod I, and by having the two nuts H⁴ and H⁵ the screw rod I' is held against undue sidewise movement while the strain incident to the forward movement of the spreader D in the ground is taken up by the abutment bar K, made adjustable to permit raising and lowering the spreader D, as previously explained.

Having thus described my invention, I claim as new and desire to secure by Letters Patent:

1. A ditching machine and tile distributer, comprising a bed adapted to be drawn over the ground and having a lengthwise-extending opening, a standard on the forward portion of the bed, a second standard on the bed near the middle thereof, a spreader mounted to slide in the said opening in the bed and having a V-shaped front for cutting into the ground to form the ditch, the said spreader at its rear end being in the form of a chamber, a bracket on the upper forward portion of the spreader, a nut on the said bracket, a vertically disposed screw rod screwing in said nut, the said screw rod being journaled at its lower end in the bed and at its upper end in the forward standard, nuts held in the chamber at the rear end of the spreader, a vertically disposed screw rod screwing in said nuts and journaled at its upper end in said second standard, and a connection between the said screw rods to rotate the same in unison for raising and lowering the spreader.

2. A ditching machine and tile distributer, comprising a bed adapted to be drawn over the ground, and having a lengthwise-extending opening, standards on the said bed, a spreader mounted to slide in the said opening and having a V-shaped front for cutting into the ground to form the ditch, the said spreader at its rear end being in the form of a chamber, vertically-disposed screw rods mounted to turn in the said standards, nuts having trunnions journaled in the chamber of said spreader, the said nuts being engaged by one of the said screw rods, a nut on the forward end of the spreader engaged by the other screw rod, a connection between the said screw rods to rotate the same in unison for raising and lowering the spreader, and a tile chute in the said spreader.

3. A ditching machine and tile distributer, comprising a bed adapted to be drawn over the ground and having a lengthwise-extending opening, standards mounted on the said bed, a spreader mounted to slide up and down in the said opening, manually-controlled means held on the said standards for raising and lowering the spreader, an abutment bar pivotally connected with the rear end of the spreader, a bearing in which the abutment bar is mounted to slide, and means for adjusting the abutment bar.

4. A ditching machine and tile distributer, comprising a bed adapted to be drawn over the ground and having a lengthwise-extending opening, standards mounted on the said bed, a spreader mounted to slide up and down in the said opening, manually-controlled means held on the said standards for raising and lowering the spreader, an abutment bar pivotally connected with the rear end of the said spreader, a nut having trunnions journaled on the bed, and a screw rod screwing in the said nut and engaging the abutment bar.

5. A ditching machine and tile distributer, comprising a bed adapted to be drawn over the ground and having a lengthwise-extending opening, standards mounted on the said bed, a spreader mounted to slide up and down in the said opening, manually-controlled means held on the said standards for raising and lowering the spreader, an abutment bar pivotally connected with the rear end of the said spreader, a nut having trunnions journaled on the bed, a screw rod screwing in the said nut and engaging the abutment bar, and a bearing for the said abutment bar to slide in, the bearing being pivoted on the said trunnions.

6. A ditching machine and tile distributer, comprising a bed adapted to be drawn over the ground in which the ditch is to be formed, a spreader vertically adjustable on the said bed, and projecting below the same, a tile chute in the spreader, means for raising and lowering the spreader, an abutment bar pivotally connected with the rear end of the spreader, and provided with a transversely extending pin, a nut having trunnions journaled on the bed, a screw rod screwing in the nut and engaging the said abutment bar, and a bearing hung on the said trunnions and provided with slots into which project the ends of said pin.

7. A ditching machine and tile distributer, comprising a bed adapted to be drawn over the ground and having a lengthwise-extending opening, standards on the said bed, a spreader mounted to slide in the said opening and having a V-shaped front for cutting into the ground to form the ditch, vertically-disposed screw rods mounted to turn in the said standards, nuts on the said spreader and engaged by the said screw rods, a connection between the said screw rods to rotate the same in unison for raising and lower the spreader, a tile chute in the said spreader, and an abutment bar pivotally connected with the rear end of the said spreader.

8. A ditching machine and tile distributer comprising a bed adapted to be drawn over the ground in which the ditch is to be formed, a spreader vertically adjustable on the bed and projecting below the same, a tile chute in the spreader, means for raising and lowering the spreader, an abutment bar pivotally connected with the rear end of the spreader, a pivoted bearing for the abutment bar to slide in, and adjusting means engaging said abutment bar.

In testimony whereof I have signed my name to this specification in the presence of two subscribing witnesses.

ALBERTUS E. HANSON.

Witnesses:
SAMUEL A. KOCH,
JACOB J. MARTI.

---

Copies of this patent may be obtained for five cents each, by addressing the "Commissioner of Patents, Washington, D. C."